United States Patent
Hannig et al.

(10) Patent No.: US 11,780,126 B2
(45) Date of Patent: Oct. 10, 2023

(54) METHOD FOR EASY START-UP OF A PRODUCTION LINE FOR MANUFACTURING EXTRUDED PLATES

(71) Applicant: Akzenta Paneele + Profile GMBH, Kaisersesch (DE)

(72) Inventors: Hans-Jürgen Hannig, Bergisch Gladbach (DE); Felix Hüllenkremer, Koblenz (DE); Peter Wendling, Mörsdorf (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 129 days.

(21) Appl. No.: 17/674,025

(22) Filed: Mar. 14, 2022

(65) Prior Publication Data

US 2022/0297355 A1  Sep. 22, 2022

(30) Foreign Application Priority Data

Mar. 17, 2021 (EP) .................................... 21163095

(51) Int. Cl.
| | |
|---|---|
| *B29C 43/34* | (2006.01) |
| *B29B 11/10* | (2006.01) |
| *B29C 43/02* | (2006.01) |
| *B29C 69/00* | (2006.01) |
| *B29L 7/00* | (2006.01) |

(52) U.S. Cl.
CPC .............. *B29C 43/34* (2013.01); *B29B 11/10* (2013.01); *B29C 43/02* (2013.01); *B29C 69/001* (2013.01);
(Continued)

(58) Field of Classification Search
CPC ......... B29C 43/22; B29C 43/24; B29C 43/32; B29C 43/34; B29C 43/3416;
(Continued)

(56) References Cited

U.S. PATENT DOCUMENTS 3,775,221 A * 11/1973 Reinhart ................ B29D 29/00
                                                                 156/543
5,190,711 A    3/1993 Blemberg
(Continued)

FOREIGN PATENT DOCUMENTS

DE   10 2007 004247 A1   7/2008
WO   WO-2010/024292 A1   3/2010

*Primary Examiner* — Thu-Khanh T. Nguyen
(74) *Attorney, Agent, or Firm* — Harness, Dickey & Pierce, P.L.C.

(57) ABSTRACT

A method for starting up a production line for manufacturing extruded plates, wherein an extruded semi-finished product comprising a free end is pressed towards a conveying device, wherein the conveying device is configured to pull the semi-finished product to a separating device, wherein a conveyor belt extending in the conveying direction is placed on the conveying device, the free end of the semi-finished product is pressed onto the conveyor belt, the conveyor belt is pulled together with the semi-finished product towards the separating device, and the free end of the semi-finished product arriving at the separating device is introduced into the separating device, while the conveyor belt is pulled away from the semi-finished product upstream of the separating device. This enables a cost-effective production of panels made from the plates.

15 Claims, 1 Drawing Sheet

(52) U.S. Cl.
CPC . *B29C 2043/3416* (2013.01); *B29L 2007/002* (2013.01)

(58) Field of Classification Search
CPC ..... B29C 43/3422; B29C 43/44; B29C 43/46; B29C 43/48
USPC .......................................................... 425/89
See application file for complete search history.

(56) References Cited

U.S. PATENT DOCUMENTS

| | | | |
|---|---|---|---|
| 6,299,808 B1* | 10/2001 | Mork | B29C 43/22 521/64 |
| 6,338,771 B1* | 1/2002 | Becker | B32B 43/006 156/752 |
| 6,649,665 B2* | 11/2003 | Kadonaga | C08F 2/32 521/64 |
| 6,822,010 B2* | 11/2004 | Fujimaru | C08F 2/32 521/64 |
| 8,770,956 B2* | 7/2014 | Desmarais | B29C 48/355 264/172.19 |
| 2007/0023953 A1 | 2/2007 | Hartmann et al. | |
| 2009/0283200 A1* | 11/2009 | Nakamura | B29C 48/154 156/64 |
| 2011/0226431 A1* | 9/2011 | Nishida | B29C 35/06 162/157.1 |
| 2012/0050874 A1* | 3/2012 | Lei | B29C 48/91 359/625 |

* cited by examiner

METHOD FOR EASY START-UP OF A PRODUCTION LINE FOR MANUFACTURING EXTRUDED PLATES

CROSS-REFERENCE TO RELATED APPLICATION

This application claims priority of European Patent Application No. 211630959 filed Mar. 17, 2021. The entire disclosure of the above application is incorporated herein by reference.

FIELD

The disclosure relates to a method by means of which a production line for manufacturing extruded plates can be started up easily. In particular, the extruded plates can be used to produce panels for covering a surface of a room.

BACKGROUND

From WO 07/07984 A1 a production line for panels made of wood is known, in which the desired panel length can be separated from a longer semi-finished product by means of a cutting tool.

From EP 3 578 384 A1 a production line for panels made of plastic is known, in which first a plate-shaped endless profile is produced.

There is a constant need to be able to produce panels cost-effectively.

It is the object of the disclosure to demonstrate measures which enable panels to be manufactured cost-effectively.

Preferred embodiments of the disclosure are provided in the subclaims and in the following description, each of which may individually or in combination constitute an aspect of the disclosure.

SUMMARY

One aspect of the disclosure relates to a method of starting up a production line for manufacturing extruded plates, in particular for panels for covering a surface of a room, in which an extruded semi-finished product is pressed with a free end towards a conveyor, wherein the conveyor is configured to pull the semi-finished product to a separating device for cutting separated plates from the semi-finished product, which has been cooled and solidified into an endless basic profile, in particular along a separating line extending transversely to the conveying direction, wherein a conveyor belt extending in the conveying direction is placed on the conveyor, the free end of the semi-finished product is pressed onto the conveyor belt and the free end of the semi-finished product arriving at the separating device is inserted into the separating device, while the conveyor belt is pulled away from the semi-finished product, in particular downwardly, upstream of the separating device.

The production line can comprise an extruder, in particular designed as a wideslit extruder, from which extrudate is pressed out. The extrudate can in particular be supplied to a calender comprising several, preferably temperature-controlled, calender rollers, in which the extrudate can be solidified by cooling and be rolled into a shape desired for the semi-finished product. The semi-finished product is pressed onto the conveyor by the extruder and/or the calender with a pressure force directed in the conveying direction. The semi-finished product can be conveyed via the conveyor from the extruder and/or the calender to the separating device, wherein the semi-finished product can cool down and solidify in the area between the extruder and/or calender provided at the inlet end of the conveyor and the separating device provided at the outlet end of the conveyor, in particular by natural convection, to such an extent that the semi-finished product can be cut into individual plates by the separating device in an optimum temperature range. For example, the separating device comprises an infeed by means of which a pulling force is applied to the semi-finished product in the conveying direction in order to draw the semi-finished product, which has cooled and solidified into an endless base profile, into the separating device at a defined conveying speed. Preferably, the pulling force acting on the outlet end of the conveyor is adapted to the compressive force acting on the inlet end of the conveyor in such a way that compression and stretching caused by thermal expansion effects during cooling of the semi-finished product are compensated at least to a large extent.

When the production line is to be started up, for example after an operational malfunction and/or a product change, there is initially no semi-finished product present on the conveyor. As a result, it is also not possible to impart a pulling force to the semi-finished product at a start of the extruder. The compressive forces present at the start of the extruder would instead strongly compress the still comparatively soft semi-finished product on the conveyor, so that ultimately no more movement of the semi-finished product via the conveyor would be possible or the threading of the free end of the semi-finished product into the separating device would be thwarted. The pulling force acting on the semi-finished product during continuous normal operation is applied in particular only at the outlet side end of the conveyor so that the semi-finished product retains its shape as a plate-shaped endless material. In principle, it would be possible to provide the conveyor with actively driven rollers over its entire length in the conveying direction so that a defined pull-off of the semi-finished product as a plate-shaped endless profile is also possible in the start-up phase before the continuous normal operation is reached. However, this would involve considerable costs for the conveyor and would increase the manufacturing costs of the panels produced by use of the production line.

Instead of equipping the conveyor with actively driven rollers along its extension, the conveyor belt is placed on the conveyor. The free end of the semi-finished product that is pressed out can thus hit the upper side of the conveyor belt, which faces upwards with respect to the direction of gravity. In this case, at least a sufficient frictional connection can be established between the semi-finished product and the conveyor belt via a fleece provided in between, where appropriate, so that the semi-finished product together with the conveyor belt can be pulled away from the extruder and/or from the calender by a pulling force acting on the conveyor belt. The pulling force acting on the conveyor belt can be provided, in particular, by a pull-off device of the conveyor that is provided anyway. With the aid of the conveyor belt, the semi-finished product can be pulled up to just before the separating device. During the time required by the free end of the semi-finished product to move from the inlet side end of the conveyor to the outlet side end of the conveyor, the semi-finished product has cooled and solidified to such an extent that it can be easily threaded into the separating device automatically and/or manually. In this case, the conveyor belt can be pulled off the semi-finished product so that the conveyor belt that might otherwise adhere to the semi-finished product does not enter the separating device at the same time. A damage to the conveyor belt in the
} separating device and operating malfunctions caused by the conveyor belt present in the separating device can thus be avoided. After the free end of the semi-finished product has been threaded into the separating device, preferably after a plate has been separated for the first time in the separating device from the semi-finished product solidified to the endless base profile, a sufficient pulling force can be exerted onto the semi-finished product even without the aid of the conveyor belt. The conveyor belt can then be completely removed so that the conveyor belt is no longer in contact with the semi-finished product. Once the conveyor belt has been removed, continuous normal operation of the production line can basically start and the start-up phase can be terminated. As appropriate, the start-up phase can extend beyond the time of threading the free end of the semi-finished product into the separating device, for example because a designated temperature profile has not yet been reached in the calender or other controlled variables have not yet settled.

The conveyor belt is a very cost-effective and easy-to-operate auxiliary means for threading the semi-finished product as a plate-shaped endless profile into the separating device during the start-up phase of the production line. Here, it is not necessary to equip the conveyor with a plurality of actively driven rollers and/or to provide an actively driven conveyor belt over the entire extension of the conveyor. The manufacturing costs of the production line, in particular for the conveyor, can thus be kept low. Since the conveyor belt can be designed not as a closed loop, but as a belt with two free ends, it is easily possible to prepare the conveyor belt for the start of the start-up phase and, after threading the free end of the semi-finished product into the separating device, to pull it off and take it away. If the conveyor belt is not required in continuous normal operation, it can be wound up space-saving and stored temporarily space-saving for the next use in another start-up phase. By pulling-off the free end of the semi-finished product with the aid of the conveyor belt during the start-up phase, the conveyor can be cost-effectively designed essentially exclusively for continuous normal operation of the production line, so that a cost-effective production of panels is enabled.

A suitable composition of the extruded semi-finished product is provided, for example, in EP 3 578 384 A1, the content of which is hereby referred to as part of the disclosure. A suitable material for the semi-finished product is in particular a thermoplastic, for example polypropylene (PP) as well as homo-, co- or terpolymers of PP, polyethylene (PE), thermoplastic elastomers such as thermoplastic polyolefins (TPO), thermoplastic styrenes (TPS), thermoplastic polyurethane (TPU), thermoplastic vulcanizates (TPV) or thermoplastic copolyesters (TPC). All of the aforementioned thermoplastics can in a common manner comprise fillers, such as chalk, layered silicates or rock flour. In order to adapt the physicochemical properties of the plastics, it may also be provided that the plastics include further additives modifying the corresponding properties of the plastic, such as plasticizers, UV stabilizers, antioxidants, flame retardants, antistatics, impact modifiers and/or colorants.

The separating device can cut the plate from the continuous base profile along the separating line by means of a cutting tool. The cutting of the respective plate is carried out in particular by a chipless cutting process, in particular shearing at a knife edge, so that cut chips which could contaminate and impair the separating device or impair the surfaces of the plate and/or of the endless base profile are avoided. Here, the knowledge is exploited that the endless base profile can still be present in the optimum temperature range even after an intermediate slight cooling and is comparatively soft and ductile, so that a low-wear cutting of the plate can easily be carried out by chipless shearing. In particular, the cutting tool of the separating device is configured to co-move with the conveying speed of the endless base profile in the conveying direction. By co-moving the cutting tool in the conveying direction at the same speed as the continuous base profile, a clean cut edge can be produced, as could otherwise only be produced by cutting an immovable workpiece. A bevelled cut surface of the plate can thus be avoided, so that the plate essentially corresponds to a cuboid.

In particular, the separated panels can be further processed into panels by use of which a surface of a room can be covered. For example, the panels can be used as a floor laminate to form a visually appealing floor of the room. The panel may comprise a panel body based on a cuboid as a basic shape, the longitudinal extension of which is usually significantly greater than its transverse extension, while the thickness of the panel body in the thickness direction is usually smaller than its transverse extension. In particular, the panel body may be formed by the separated panel or a panel body present after at least one further separation of the panel.

The panel body may comprise on one long side extending in the longitudinal direction a bung shoulder extending in particular continuously in the longitudinal direction and projecting in the transverse direction, and on the other side a bung groove formed in the panel body in the transverse direction, so that essentially identically designed panels can be connected to one another by means of a tongue-and-groove connection in the form of a tongue-and-groove joint. In addition, a locking hook can project in the longitudinal direction from the short side of the panel body extending in the transverse direction, while a spring body can project from the other short side of the panel body, wherein the spring body delimits a receiving groove, so that essentially identically configured panels can also be interlocked with each other at their short sides by means of a tongue-and-groove joint. During assembly, the one panel may rest flat on a subsurface defining a plane of use, for example a floor, a side wall or a ceiling of a room. If necessary, the further panel can, for example, be placed slightly inclined at an angle of about 30° with an already mounted panel extending laterally next to the panel at the long side and then pivoted onto the subsurface, whereby the tongue-and-groove joint between the locking hook of the panel and the receiving groove of the further panel can be established.

In the continuous normal operation of the production line it can be provided that at an end of the conveyor facing the extruder a compressive force directed in the conveying direction is applied at the semi-finished product in particular in an essentially pasty and/or molten state, and at an end of the conveyor facing the separation device a pulling force directed in the conveying direction is applied at the endless profile of the semi-finished product in particular in an essentially solid state, wherein the applied compressive force and the applied pulling force are dimensioned in such a way that compression and stretching caused by thermal expansion effects during cooling of the semi-finished product are compensated for at least to a large extent. Here, in particular, the conveying speed along the conveying direction can be adapted locally in such a way that thermal expansion effects resulting from cooling along the conveying direction and the shrinking amount of the semi-finished product in the conveying direction can be compensated. The compressive force acting on the soft end of the semi-finished product can be built up in particular by subsequent material of the semi-finished product leaving the calender, while the pulling forces at the areas of the semi-finished product that have already been sufficiently solidified can be provided by an actively impacting conveying element of the conveyor, in particular a pull-off device comprising actively driven rolls. Unnecessary internal stresses in the semi-finished product can thus be avoided, so that unwanted deformation, for example wave formation, of the semi-finished product can be prevented. The conveying speed of the conveyor belt in the start-up phase can, in particular, essentially correspond to an average conveying speed of the semi-finished product in the continuous normal operation. In this way, unnecessarily large compressions and elongations of the semi-finished product in the start-up phase can be avoided, which simplifies the threading of the semi-finished product into the separating device.

In particular, the conveyor can be composed of different subunits whose respective conveying speeds can be set the same or different. By setting different conveying speeds in different sub-areas in particular a reduction in length of the respective conveyed profile caused by cooling to the extent of a thermally induced shrinkage can be compensated, so that unnecessary stresses in the conveyed profile caused by thermal expansion effects can be compensated for. In particular, the conveyor can be interrupted in the area of the separating device, so that the separating device can carry out a continuous separating cut extending transversely to the conveying direction. In this case, the sub-unit provided downstream the separating device can have a higher conveying speed than a sub-unit of the conveyor provided upstream of the separating device in the conveying direction, so that the separation of the cut plates can be improved. Preferably, an end of the conveyor facing the separating device is spaced apart from the separating device so that a free space is formed which can be easily bridged by the endless base profile and is large enough to allow the conveyor belt to be pulled off the semi-finished product solidified to the endless base profile. The conveyor or the respective sub-unit of the conveyor can, for example, comprise actively driven and/or passively co-rotating rollers and/or a belt moved in the conveying direction in order to be able to convey the respective profile in the conveying direction. If the conveyor comprises only driven rollers as drive means for conveying the semi-finished product, it is possible to provide a distance between the rollers that promotes natural convection for cooling the semi-finished product, wherein the distance between successive rollers is small enough to prevent corrugation of the semi-finished product in a partial area that has not yet solidified and is rather soft. The conveyor is straight at least up to the separating device, i.e. is configured without curves or bends, so that the semi-finished product can be conveyed without bends along a straight line, preferably in a straight line lying in a horizontal plane.

Downstream the extruder and/or the calender in the conveying direction, the production line can comprise a smoothing unit for smoothing an upper side and/or an underside of the semi-finished product, in particular with a defined surface quality. The smoothing unit can be in particular be provided essentially immediately downstream of the calender. The smoothing unit can in particular comprise a lower press tool, in particular a flat plate or roller, and an upper press tool, in particular a flat plate or roller, which can be pressed towards one another in order to imprint a desired shape and/or surface quality to the still soft semi-finished product. Preferably, no feed is imparted to the semi-finished product by the pressing tools, so that the feed in the conveying direction through the smoothing unit in the start-up phase is achieved essentially exclusively by means of the conveyor belt. In particular, the smoothing unit can press the belt against the semi-finished product, whereby the bond between the semi-finished product and the conveyor belt and/or with the fleece provided therebetween can be improved.

After cooling and solidifying into an endless profile, the semi-finished product can be fed to an edge cutting device for cutting off an edge region of the semi-finished product that is disposed lateral to the conveying direction, so that in the conveying direction downstream of the edge cutting device the semi-finished product is present as a plate-shaped endless profile comprising a predefined base plate width extending transversely to the conveying direction, wherein the edge regions cut off in the edge cutting device are discarded as rejects. If necessary, the cut edge areas can be crushed so that the crushed edge areas can be easily transported further, in particular as pourable granules. Further processing, in particular recycling, of the cut-off edge regions is thus simplified.

The edge cutting device can in particular cut off the edge areas exceeding the desired base plate width continuously. For this purpose, the semi-finished product can be driven against a stationary knife or cutting roller, for example. The edge regions are cut off in particular by a chipless cutting process, in particular shearing at a knife edge, so that cut chips which could contaminate and impair the edge cutting device or impair the surfaces of the endless profile are avoided. Here, the knowledge is exploited, that the semi-finished product is comparatively soft and ductile in the optimum temperature range, so that low-wear cutting of the edge areas can easily be carried out by chipless shearing. In addition, it is possible to cut off the separated edge areas as a strip-shaped endless profile, which can subsequently be crushed into sections of the same size and shape, in particular as granules. This facilitates further processing of the cut edge areas.

Sufficient installation space can be provided between the edge cutting device and the separating device in order to further process the edge areas cut off in the edge cutting device. For this purpose, the installation space between the edge cutting device and the separating device can be provided below the endless profile and the conveying elements provided for conveying the endless profile in the conveying direction. The further processing of the cut edge areas can thus follow directly the edge cutting device, without the need for significantly increasing an installation space of the production line transverse to the conveying direction. Instead, the further processing of the cut edge areas can be provided in an installation surface that is already being used by the conveyor anyway, wherein a height area that is rather less used by the conveyor can be provided for the further processing of the cut edge areas. The further processing of the cut edge areas can thus be carried out in a manner that is essentially almost neutral in terms of installation space.

In the conveying direction between the edge cutting device and the separating device preferably a collecting container for collecting the edge areas cut in the edge cutting device can be arranged. The edge regions cut as a strip-shaped endless profile can still be connected to the semi-finished product upstream of the separating tool of the edge cutting device, so that the cut-off edge regions can extend only slightly laterally spaced from the continuous profile in the conveying direction downstream of the separating tool of the edge cutting device. The cut edge areas can thus easily be fed to the collecting container provided between the edge cutting device and the separating device, without the edge areas cut off as a strip-shaped endless profile being able to break off in an uncontrolled manner. The cut-off edge areas can thus be easily be continuously discharged and collected in the collecting container. The edge areas cut-off as a strip-shaped continuous profile can break into smaller pieces in the collection container or be crushed in a defined manner beforehand. Preferably, the cut-off edge regions are crushed in at least one crushing device, which is in particular designed as a cutting mill, in particular in pourable granules, and are fed as granules to the collecting container and/or a recycling container. The collecting container can in particular be moved away by a relative movement transverse to the conveying direction, and replaced by a still empty collecting container, so that the cut-off edge regions can be taken away batch by batch. Preferably, the cut-off edge regions are discharged continuously.

In particular, the collecting container can be arranged below the endless profile in the direction of gravity, wherein the endless profile in particular covers the collecting container at least to a large extent when viewed in the direction of gravity. The collecting container can be provided at a sufficiently low level to accommodate the possibly already crushed cut-off edge strips of the endless profile at least partially laterally offset and/or covered by the endless profile below the endless profile. A lateral protrusion of the collecting container beyond the lateral extension of the endless profile can thus be kept low or even avoided entirely. The installation space requirement can thus be minimized. In addition, it is easily possible to configure the collection container open at the top, so that by means of a visual inspection it can easily be determined whether the collecting container should be replaced by an empty collecting container. The components of the conveyor provided above the collecting container, in particular rolls, and/or the material of the endless profile can cover the opening of the collection container that is open at the top and hold back broken pieces of the cut-off edge region jumping up from the inside of the collection container.

In particular, the conveyor exerts a pulling force in the conveying direction on the semi-finished product only in a partial area facing the separating device. In principle, it is possible for the pulling force exerted on the semi-finished product to be applied exclusively by the separating device in the continuous normal operation after completion of the start-up phase. If the pulling force applied on the semi-finished product is provided by the conveyor in addition to or as an alternative to the separating device, for example in order to press the semi-finished product, which has been cooled and solidified into an endless base profile, at least proportionally with a compressive force into the separating device, it is sufficient if actively driven conveying elements are provided only in a partial area. In this case, the actively driven conveying elements are provided at the end of the conveyor facing the separating device, in particular in the form of a pull-off device comprising actively driven rolls, so that, in particular over a large part of the extension of the conveyor in the conveying direction, between the extruder and/or the calender on the one hand and the partial area with the actively driven conveying elements only passively co-running conveying elements on the other hand can be provided. This allows compressions and expansions in the material of the semi-finished product caused by thermal expansion effects during cooling to be avoided on the conveyor. In addition, the conveyor can be designed particularly cost-effective.

The conveyor and/or an actively driven conveying element of the separating device provides in particular a conveying speed $v_1$ of 4.5 m/min$\leq v_1 \leq$21.0 m/min, in particular 5.0 m/min$\leq v_1 \leq$8.0 m/min and preferably $v_1$=5.5 m/min±0.5 m/min or $v_1$=7.5 m/min±0.5 m/min. This conveying speed allows high productivity without inducing unnecessary internal stresses in the semi-finished product. Additionally or alternatively, the conveying speed $v_1$ is set in such a way that, for a given thickness and a given base plate width of the plates to be produced, a certain, in particular essentially constant, extruder throughput, for example 6000 kg/h or 8500 kg/h, is achieved. The conveying speed $v_1$ can thus be adapted to the maximum extruder throughput that can be provided by the extruder, whereby a particularly high productivity is achieved.

Preferably, at the end of the conveyor facing away from the separating device a compressive force is exerted on the semi-finished product in the conveying direction by an extruder and/or a calender. The compressive force exerted anyway during extrusion and/or in the calender can thus be used to initially push the extrudate or the semi-finished product along the conveyor without the need for an actively driven conveying element of the conveyor. The conveyor can thus be designed particularly cost-effective.

In particular, the free end of the semi-finished product at the exit of an extruder is pushed in a substantially molten state onto the conveyor belt which in particular leads to a calender, wherein in particular a fleece is provided between the semi-finished product and the conveyor belt for bonding the semi-finished product to the conveyor belt. As a result, the extrudate, which is still in melt form, can hit the conveyor belt directly at the exit of the extruder during the start-up phase, which can pull the extrudate, which is still very soft, to a calender. The extruder and the calender can thus be provided one behind the other in the horizontal direction, in particular at a substantially common height level, so that the semi-finished product can be moved through the production line exclusively in the horizontal direction. It is not necessary to provide the extruder in the gravity direction above the calender and to convey the extrudate by gravity from the extruder to the calender. A 90° deflection of the semi-finished product from a vertical to a horizontal direction is avoided. This keeps the vertical installation space requirement of the production line low and improves the shape accuracy and quality of the endless profile. In order to prevent the very soft extrudate from flowing away, and to ensure that a comparatively narrow conveyor belt is sufficient, the fleece can be provided between the semi-finished product in the molten state exiting the extruder and the conveyor belt, the width of which perpendicular to the conveying direction can essentially correspond to the width of the endless profile, wherein the fleece can be somewhat wider or somewhat narrower than the width of the endless profile, for example by ±5 cm. In addition, the fleece can facilitate a subsequent removal of the conveyor belt from the semi-finished product. In particular, the fleece can be configured open-pored and/or otherwise roughened so that the fleece can form a good bond with the still very soft semi-finished product and provide a good frictional connection with the conveyor belt.

Particularly preferably, the conveyor belt is essentially pulled at a conveying speed intended for continuous normal operation, in particular by motor and/or manually. Unnecessary compression and elongation of the semi-finished product in the start-up phase are thus avoided. In addition, the temperature conditions and/or cooling conditions in the start-up phase are comparable to those during the continuous normal operation, so that the free end of the semi-finished product can be fed to the separating device comparatively easily. It can be ensured that the semi-finished product fed to the separating device in the start-up phase is not too warm and too soft but also not too cold and too hard. In particular, it is possible to prevent a thickening of the semi-finished product caused by a too low conveying speed, which could make the separation of plates in the separating device more difficult or thwart it. In addition, it is possible to avoid constrictions in the still soft semi-finished product caused by a too fast conveying speed, due to which the semi-finished product could break through in the start-up phase, in particular when threading into the separating device. This avoids or at least reduces the risk of causing operational malfunctions during the start-up phase.

In particular, it is envisaged that only exactly one conveyor belt is used or that the movements of several conveyor belts provided in the conveying direction are positively coupled to each other. This makes it possible to avoid a local conveying speed that varies over the width of the semi-finished product extending transverse to the conveying direction. Warping or lateral running away of the semi-finished product from the conveyor is thus avoided, so that unnecessary difficulties in feeding the free end of the semi-finished product, which has solidified into the endless base profile, to the separating device are avoided.

Preferably, the conveyor belt comprises a pulling end facing towards the separating device and a loose end facing away from the pulling end, wherein an extension s of the conveyor belt between the pulling end and the loose end at least corresponds to an extension I of the conveyor between a point of contact of the free end of the semi-finished product on the conveyor and the separating device, wherein in particular $1.0 < s/I \leq 2.0$, preferably $1.1 \leq s/I \leq 1.8$, and particularly preferably $1.3 \leq s/I \leq 1.5$. The pulling end of the conveyor belt can protrude slightly at the end of the conveyor belt facing the separating device, in order to better introduce the pulling force into the conveyor belt. Here, the pulling force can be applied by machine, for example by use of a motor, or manually. The loose end of the conveyor belt can be provided at the end of the conveyor facing the extruder, so that the free end of the semi-finished product impinging the conveyor for the first time impinges on the upper side of the conveyor belt. In principle, a small overlap between the conveyor belt and the semi-finished product in the start-up phase can be sufficient, in particular in order to be able to complete the start-up phase as quickly as possible after threading the free end of the semi-finished product into the separating device and to switch to continuous normal operation. However, in order to reliably prevent the conveyor belt from tearing loose from the semi-finished product when the semi-finished product is pulled by use of the conveyor belt, a larger overlap can be provided between the conveyor belt and the semi-finished product in the conveying direction in order to ensure a better bond between the conveyor belt and the semi-finished product. At the same time, this makes it possible to keep the width of the conveyor belt small transversely to the conveying direction and still achieve a good bond with the semi-finished product, which simplifies handling and storage of the conveyor belt.

Particularly preferably, the following applies to a total width b of the at least one conveyor belt transverse to the conveying direction at an average width B of the semi-finished product when it impinges on the conveyor $0.01 \leq b/B \leq 0.90$, in particular $0.05 \leq b/B \leq 0.50$, preferably $0.10 \leq b/B \leq 0.25$ and particularly preferably $0.15 \leq b/B \leq 0.20$. It has been recognized that in the start-up phase it is not necessary to exert the pulling force over the entire width of the semi-finished product and that it is sufficient if the conveyor belt is configured narrow compared to the width of the semi-finished product. In particular, if a calender is provided between the extruder and the conveyor, the material of the semi-finished product has sufficient strength that any deformations of the semi-finished product introduced by the conveyor belt are so small that the deformations over the length of the conveyor and also in the separating device do not lead to difficulties. The costs for the conveyor belt and the storage for the conveyor belt can thus be kept low.

In particular, the conveyor belt is at least partially pressed into the material of the semi-finished product. The material of the semi-finished product, which is still soft when it impinges on the conveyor belt or the fleece provided between the semi-finished product and the conveyor belt, can adapt to the shape of the conveyor belt on its underside facing the conveyor belt due to its own weight. The material of the semi-finished product can pass at the sides of the conveyor belt facing transversely to the conveying direction and reach an upper side of the conveyor. This improves the bond between the conveyor belt and the semi-finished product.

Preferably, the conveyor belt is made of a textile material, wherein the textile material is provided on an upper side and/or an underside of the conveyor belt with a release layer for providing a releasability of the conveyor belt from the semi-finished product. The release layer can be designed, for example, as an in particular sprayed on coating, or as a glued on separate material layer. The textile material can impart a particularly high tensile strength to the conveyor belt. In addition, the textile material can impart a deliberately non-uniform surface structure, which improves the bond with the semi-finished product. The release layer can prevent the conveyor belt from sticking to the semi-finished product, for example by adhesion or chemical bonding, so that the conveyor belt can be easily pulled off the solidified semi-finished product. For example, the conveyor belt can be easily pulled off sharply from the underside of the semi-finished product just upstream the separating device.

Particularly preferably, the conveyor comprises at least one actively driven roll, which in particular is part of a pull-off device for providing a pulling force at the semi-finished product, wherein the conveyor belt is pulled off along an actively driven roll. The conveyor belt can be pulled off by the actively driven roll, for example, by about 90° or even more from the underside of the semi-finished product. In this case, the actively driven roll can not only press the semi-finished product into the separating device, but also exert a force on the conveyor belt in order to assist in pulling the conveyor belt off the semi-finished product. When an operator wants to pull off the conveyor belt, he or she can pull the belt along the actively driven roll, thus simplifying the removal of the conveyor belt.

In particular, the conveyor belt is tempered to a predefined operating temperature before coming into contact with the semi-finished product. This can facilitate bonding of the conveyor belt with the semi-finished product. For example, the conveyor belt can be preheated to a temperature at which the conveyor belt can be easily pressed into the not yet solidified material of the semi-finished product. Alternatively, it may already be sufficient if the conveyor belt is fed at ambient temperature.

Preferably, the portion of the semi-finished product that extends in the conveying direction and has been in contact with the conveyor belt, is discarded as reject after separation as plates in the separating device. It cannot be excluded that the surface of the semi-finished product that was in contact with the conveyor belt does not have the intended surface quality. Therefore, this portion of the semi-finished product can be discarded as reject and is not processed as a product. Here, a test of material properties is not necessary, so that the determination of the separated plates as reject is simplified and cost-effective.

In particular, the conveyor belt is conveyed at a conveying speed $v_1$ of 4.5 m/min≤$v_1$≤21.0 m/s, in particular 5.0 m/min≤$v_1$≤8.0 m/min and preferably $v_1$=5.5 m/s±0.5 m/min or $v_1$=7.5 m/s±0.5 m/min. The conveyor belt and the semi-finished product pulled by the conveyor belt can thus already be moved during the start-up phase at the conveying speed which, depending on the intended product for the separated plates, already essentially corresponds to the conveying speed provided during continuous normal operation.

Particularly preferably, the conveyor belt is pulled off from the semi-finished product in a non-destructive manner. Thus, a damage to the conveyor belt and a breakthrough of the solidified semi-finished product is avoided. For this purpose, the conveyor belt can be pulled off, in particular sharply, downwardly from the underside of the semi-finished product with a component of movement in the direction of gravity. The conveyor belt can thus be easily reused and recycled. It is even possible that a cleaning of the conveyor belt is not necessary in order to reuse the conveyor belt during a newly occurring start-up phase.

In particular, the pulled-off conveyor belt is reused for a new execution of the method, which may be designed and further developed as described above. Particularly preferably, the pulled-off conveyor belt is reused not only once, but several times, preferably repeatedly, for the renewed execution of the method. Since the conveyor belt is only used in the start-up phase of the production line, the service life of the conveyor belt can be longer than the service life of the production line, so that it is in particular possible to use the conveyor belt for all the start-up phases occurring in the production line according to the method described above. It is assumed that a significant wear of the conveyor belt beyond normal aging defects is generally not to be expected. As long as the state of wear of the conveyor belt and/or the production line permits, the same conveyor belt can be reused again and again during the start-up phases occurring in the production line in accordance with the method described above.

Preferably, cooling of the endless base profile between the extruder and/or the calender and the separating device requires exclusively a cooling by convection, in particular exclusively by natural convection. The expense of active cooling, in particular by use of an additional coolant, is thus avoided and saved. In addition, internal stresses caused by excessive cooling can be avoided.

Particularly preferably, downstream of the separating device in the conveying direction, a cutting device is provided for cutting the plate into individual panels, in particular chipless, in particular along at least one cutting line extending in the conveying direction. Thus, the cutting of the plate into panels, or into panel bodies intended for the production of panels, can occur in a temperature range which is still in the optimum temperature range or in a temperature range slightly below it. Since the cutting device does not process an endless profile, but already separated plates, preferably chipless, a good cutting result with even cut surfaces can be achieved even at a lower temperature. Instead of continuous cutting, the cutting device can provide batch-type cutting with the use of at least one knife, wherein due to the lower temperature, it is easily possible to press the panels to be cut by use of at least one downholder without causing a wave-like deformation of the plate and the panel to be cut. The cutting process in the cutting device can thus be implemented with a higher precision and a good cutting quality.

The separated plates and/or panels can be stacked towards the end of the conveyor in a packaging device, preferably on a pallet. The stacked plates and/or panels can, in particular after cooling to ambient temperature, be supplied to further processing, in particular machining, for example in order to form a bung-type shoulder, a bung-type groove, a locking hook or a spring body in the side surfaces connecting the upper side with the lower side.

In the following, the disclosure will be explained with reference to the accompanying drawings based on preferred exemplary embodiments, wherein the features shown below may each individually or in combination constitute an aspect of the disclosure.

DETAILED DESCRIPTION

Figure 1:
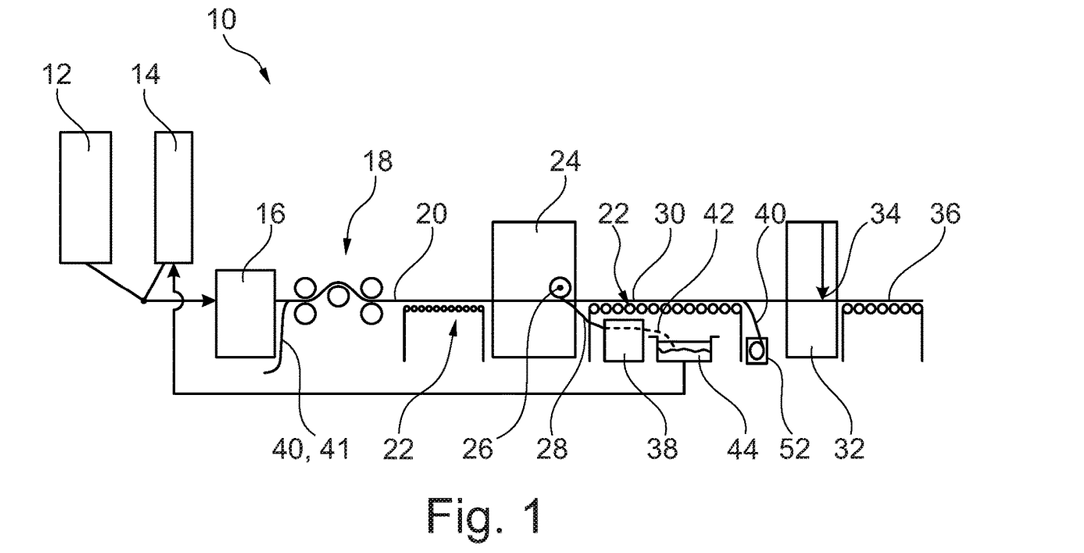
FIG. 1 shows a schematic principle representation of a production line.

The production line 10 shown in FIG. 1 comprises a storage container 12 and a recycling container 14, from which at least one extruder 16 can be supplied with an educt to be extruded. The extruder 16 can feed the educt via a wide slot die as extrudate to a calender 18, so that downstream the calender a semi-finished product in the form of a plate-shaped endless profile is present, which can be conveyed by a conveyor 22 in the conveying direction at a certain conveying speed. Here, the semi-finished product 20 can be cooled during conveying, in particular by natural convection, wherein the local conveying speed of the conveyor 22 can be adapted in such a way that thermal expansion effects by shrinkage of the material of the semi-finished product can be compensated. The semi-finished product can be supplied from the conveyor 22, where appropriate, to a smoothing unit for smoothing an upper side and/or an underside of the semi-finished product with a defined surface quality. After the optionally provided smoothing the semi-finished product is fed by the conveyor 22 to an edge cutting device 24 which cuts off edge strips 28, in particular by use of a rolling knife 26, so that an endless base profile 30 with straightened side edges and a defined base plate width transverse to the conveying direction remains on the conveyor 22. The endless base profile 30 is then fed to a separating device 32 which, in particular by use of a guillotine knife 34 co-moving in the conveying direction, cuts off plates 36 which can be fed as a product for further processing. The average temperature of the semi-finished product in the edge cutting device 24 and the average temperature of the endless base profile 30 in the separating device 32 both lie within a comparatively narrow optimum temperature range in which the material of the semi-finished product and the endless base profile 30 are still warm enough so that, due to the ductility that is still present, a mechanical resistance to penetration by a cutting tool is low, but is already hard enough so that the material does not stick to the cutting tool or deform too much under the shear stress occurring during cutting.

The edge regions 28 cut off as strip-shaped endless profiles are fed to a shredding device 38, in which the edge regions 28 can be shredded into edge pieces 42 of essentially the same size and fed to a collecting container 44. The shredding device 38 and the collecting container 44 are provided between the separating device 32 and the edge cutting device 24 at a height level below the height of the continuous base profile 30. From the collecting container 44, the edge pieces 42 can be conveyed, for example, by use of a return device, to the recycling container 14 and reused. Additionally or alternatively, the separated and, in particular, ground edge pieces 42 can be fed to a container that is different from the recycling container 14 and fed via a metering device to the extruder 16 as an educt, preferably continuously.

When the production line is started up, no semi-finished product has yet been placed on the conveyor and no endless base profile 30 has yet been threaded into the separating device 32. In order to be able to easily feed the semi-finished product arriving on the conveyor 22 for the first time in the start-up phase to the separating device 32 and to be able to change into continuous normal operation, a conveyor belt 40 is provided for the start-up phase only, which extends over the entire extension of the conveyor 22 in the conveying direction at the beginning of the start-up phase. The conveyor belt 40, together with a fleece 41 provided between the conveyor belt 40 and the semi-finished product, can be supplied at the exit of the extruder 16 and still upstream the calender 18 and a smoothing unit, so that the semi-finished product leaving the extruder 16 as a still meltable extrudate can be pulled in the horizontal direction into the calender 18 by means of the conveyor belt 40 and the fleece 41.

Figure 2:
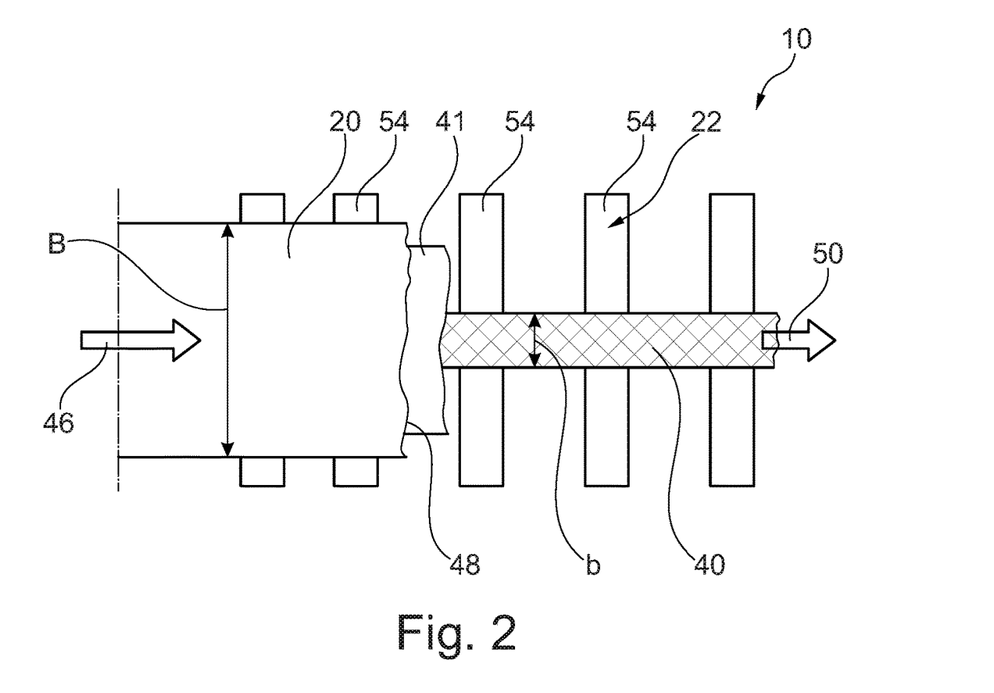
FIG. 2 shows a schematic top view of a part of the production line of FIG. 1 during a start-up phase.

As shown in FIG. 2, a free end 48 of the semi-finished product 20 pressed out of the extruder 16 with a compressive force 46 towards the calender 18, can impinge on the conveyor belt 40 and the fleece 41, wherein at least the conveyor belt 40 is placed behind the calender 18 on the conveyor device 22. At a pulling end of the conveyor belt 40 facing the separating device 32, a pulling force 50 can be introduced into the conveyor belt by means of a pull-off device of the conveyor 22 comprising actively driven rolls, in order to be able to pull off the free end 48 of the semi-finished product 20 and the subsequent material of the semi-finished product 20. However, the pulling force 50 can also be applied manually or, for example, by means of a winding machine 50 driven by an electric motor for automatically winding the conveyor belt 40. By bonding the conveyor belt 40 with the semi-finished product 20 via the fleece 41, the semi-finished product 20 can be pulled by the conveyor belt 40 via the conveyor 22, in particular via a partial area of the conveyor 22 comprising passively co-rotating rolls 54 towards the separating device 32. In this case, the width b of the conveyor belt 40 can be considerably smaller than the average width B of the semi-finished product 20, whereas a width of the fleece 41 may roughly correspond to the average width B of the semi-finished product 20. When the free end 48 of the semi-finished product 20 has arrived at the separating device 32 with support of the conveyor belt 40, the semi-finished product 20 has in the meantime cooled down and solidified to such an extent that the conveyor belt can be pulled off between the conveyor device 22 and the separating device 32, in particular sharply downwards from the semi-finished product 20 solidified to the endless base profile 30. In this case, the free end 48 can be pulled off in the conveying direction downstream of a pull-off device with actively driven rolls and upstream of the separating device 32. The free end 48 of the endless base profile 30 can then be fed to the separating device 32 without the conveyor belt 40, whereby basically the continuous normal operation can begin.

The fleece 41 can remain adhered to the endless base profile 30 or, comparable to the conveyor belt 40, also be pulled off the endless base profile 30. A remaining length of the conveyor belt 40 can further be pulled off for safety reasons until the conveyor belt 40 is completely released from the semi-finished product 20 and can be removed. As a rule, normal operation would be postponed for a while until all relevant process parameters are within a target range for normal operation and a consistently high product quality can be ensured in continuous normal operation, in particular that a corrugation of the separated plates 36 lies within an intended tolerance range. The plates 36 that have been in contact with the conveyor belt 40 and into the material of which the conveyor belt 40 has been able to press, can be discarded as reject without a more detailed, time-consuming inspection and can preferably be crushed and returned to the recycling container 14. The recognition of the plates 36 to be discarded as reject is additionally simplified if the fleece 41 remains adhered to the plates 36 to be discarded.

What is claimed is:

1. A method for starting up a production line for manufacturing extruded plates, comprising:
   pressing an extruded semi-finished product with a free end towards a conveyor,
   wherein the conveyor is configured to convey the semi-finished product to a separating device for cutting off separated plates from the semi-finished product cooled and solidified into an endless base profile along a cutting line extending transversely to a conveying direction,
   wherein a conveyor belt extending in the conveying direction is placed on the conveyor, the conveyor belt including two free ends, one of the free ends including a pulling end facing towards the separating device, the other of the free ends including a loose end facing away from the pulling end,
   the free end of the semi-finished product is pressed onto the conveyor belt,
   the conveyor belt is pulled together with the semi-finished product towards the separating device and the free end of the semi-finished product arriving at the separating device is introduced into the separating device, while the conveyor belt is pulled away from the semi-finished product upstream the separating device.

2. The method according to claim 1, wherein the conveyor exerts a pulling force in the conveying direction on the semi-finished product only in a partial area facing the separating device.

3. The method according to claim 1, wherein at the end of the conveyor facing away from the separating device, a compressive force is exerted in the conveying direction on the semi-finished product by an extruder and/or a calender.

4. The method according to claim 1, wherein the free end of the semi-finished product at the exit of an extruder is pressed in a substantially molten state onto the conveyor belt which leads to a calender, wherein in particular between the semi-finished product and the conveyor belt a fleece is provided for bonding the semi-finished product to the conveyor belt.

5. The method according to claim 1, wherein the conveyor belt is pulled substantially at a conveying speed provided for continuous normal operation by motor and/or manually.

6. The method according to claim 1, wherein only exactly one conveyor belt is used or a movement in the conveying direction of several conveyor belts provided are positively coupled to one another.

7. The method according to claim 1, wherein an extension s of the conveyor belt between the pulling end and the loose end is at least equal to an extension I of the conveyor between a point of impact of the free end of the semi-finished product on the conveyor and the separating device, wherein $1.0 \leq s/I \leq 2.0$.

8. The method according to claim 1, wherein for a total width b of the at least one conveyor belt transverse to the conveying direction at an average width B of the semi-finished product when it impinges on the conveyor $0.01 \leq b/B \leq 0.90$ applies.

9. The method according to claim 1, wherein the conveyor belt is pressed at least partially into the material of the semi-finished product.

10. The method according to claim 1, wherein the conveyor belt is made of a textile material, wherein the textile material is provided at an upper side and/or a lower side of the conveyor belt with a release layer for providing releasability of the conveyor belt from the semi-finished product.

11. The method according to claim 1, wherein the conveyor device comprises at least one actively driven roll, which is part of a pull-off device for providing a pulling force at the semi-finished product, wherein the conveyor belt is pulled off along an actively driven roll.

12. The method according to claim 1, wherein a portion of the semi-finished product which extends in the conveying direction and which has been in contact with the conveyor belt is discarded as reject after cutting off as plates in the separating device.

13. The method according to claim 1, characterized in that the conveyor belt is pulled at a conveying speed $v_1$ of 4.5 m/min$\leq v_1 \leq$21.0 m/min.

14. The method according to claim 1, characterized in that the conveyor belt is pulled at a conveying speed $v_1$ of 5.5 m/min$\pm$0.5 m/min or $v_1$=7.5 m/min$\pm$0.5 m/min.

15. The method according to claim 1, wherein the conveyor belt is pulled-off and reused for a reapplied implementation of the method according to claim 1.

* * * * *